United States Patent
Intengan

(10) Patent No.: US 6,446,989 B1
(45) Date of Patent: Sep. 10, 2002

(54) PIN DRIVE WHEELBARROW

(76) Inventor: Franklin Sanchez Intengan, 17831 NW. 79th Pl., P.S.N., Miami, FL (US) 33015

( * ) Notice: Subject to any disclaimer, the term of this patent is extended or adjusted under 35 U.S.C. 154(b) by 0 days.

(21) Appl. No.: 09/711,491

(22) Filed: Nov. 13, 2000

Related U.S. Application Data

(63) Continuation-in-part of application No. 09/259,449, filed on Mar. 1, 1999, now abandoned.

(51) Int. Cl.⁷ .................................................. B62B 3/00
(52) U.S. Cl. .............. 280/47.34; 280/47.3; 280/47.315; 280/653
(58) Field of Search ........................ 280/47.34, 47.31, 280/47.12, 645, 653, 654, 655, 655.1, 659; 16/430, 436, 438, 437

(56) References Cited

U.S. PATENT DOCUMENTS

| | | | |
|---|---|---|---|
| 931,096 A | * 8/1909 | Todd | 280/653 |
| 1,255,128 A | * 2/1918 | Bayley | 280/653 |
| 1,407,690 A | * 2/1922 | Berry | 280/653 |
| 1,735,527 A | * 11/1929 | Cwik | 280/653 |
| 1,901,878 A | 3/1933 | Schwenk | |
| 2,598,261 A | * 5/1952 | Hrabal | 280/653 |
| 3,552,760 A | 1/1971 | Sine | 280/36 |
| 3,552,762 A | 1/1971 | Garber | 280/47.33 |
| 3,722,904 A | 3/1973 | Puckett | 280/36 R |
| 3,826,511 A | 7/1974 | Frank | 280/36 R |
| 4,471,996 A | 9/1984 | Primeau | 298/3 |
| 4,523,774 A | 6/1985 | Dickerson | 280/655 |
| 4,767,128 A | 8/1988 | Terhune | 280/47.2 |
| 4,861,110 A | 8/1989 | Rumpke | 298/2 |
| 4,921,305 A | 5/1990 | Steer | 298/3 |
| 5,040,808 A | 8/1991 | McIntyre | 280/47.19 |
| 5,087,061 A | 2/1992 | Wallace | 280/30 |
| 5,087,062 A | 2/1992 | Chappell et al. | 280/47.31 |

FOREIGN PATENT DOCUMENTS

GB 22337539 5/1991

* cited by examiner

Primary Examiner—Brian L. Johnson
Assistant Examiner—Tony Winner
(74) Attorney, Agent, or Firm—Oltman, Flynn & Kubler

(57) ABSTRACT

A wheelbarrow includes a load carrying bin, a frame structure, a number of wheels, and a closed loop pivotal handle. The handle is attached near the rear of the wheelbarrow on a pivoting axis so that the user may adjust the height of the handle. The handle may be attached with two threaded pins having knobs at one end so a user may fix the handle at one particular height, may leave the handle entirely adjustable, or may remove the handle entirely for convenient storage of the device. The wheels are placed to provide complete support for the load and may include vertical swivel axes to make moving the wheelbarrow easier.

26 Claims, 8 Drawing Sheets

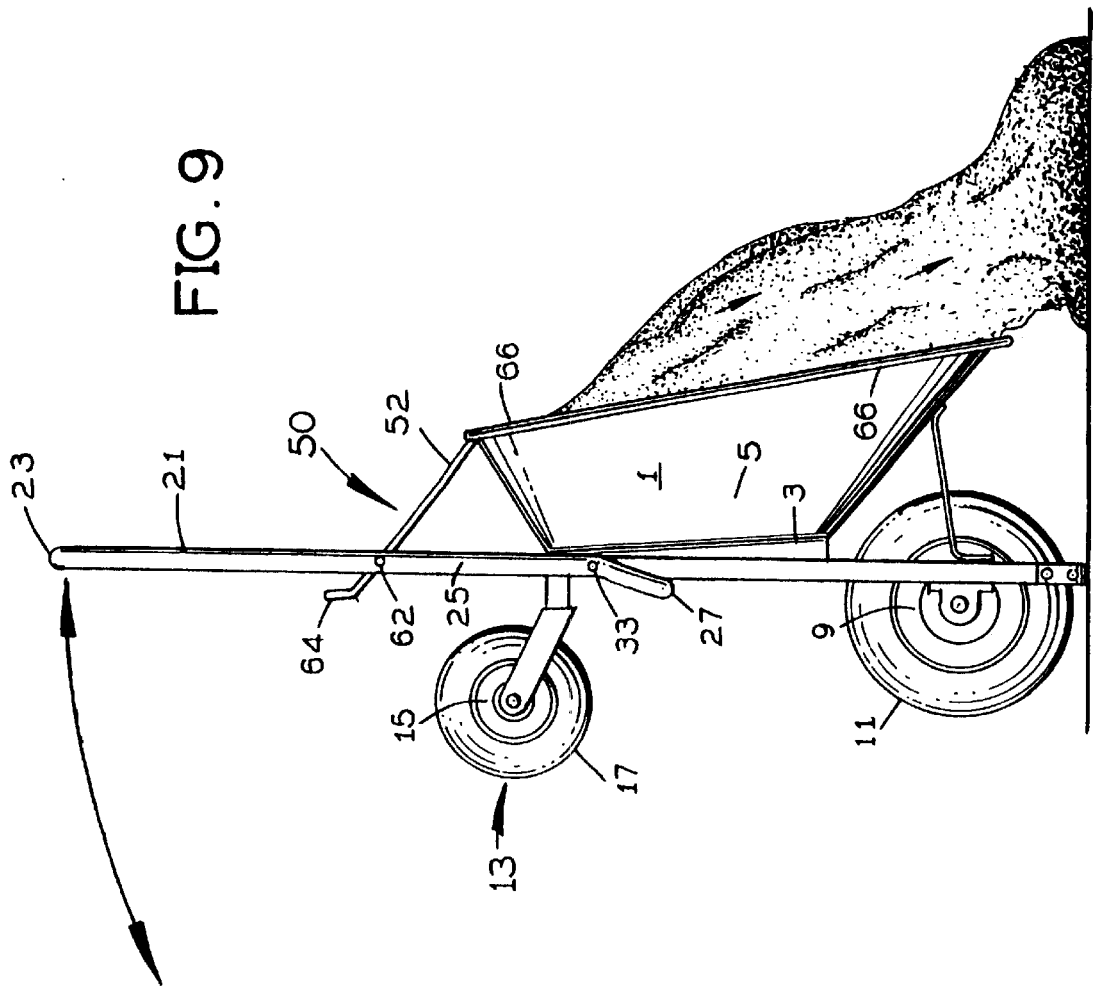

PIN DRIVE WHEELBARROW

FILING HISTORY

This application is a continuation-in-part of application Ser. No. 09/259,449, filed on Mar. 1, 1999 now abandoned.

FIELD OF THE INVENTION

1. Field of the Invention

The present invention relates generally to load-carrying devices and in particular to wheelbarrows.

Wheelbarrows are well known in the art for use as load-carrying devices. Their popularity has derived from the usefulness and efficiency of this tool. Probably the most prevalent variety of wheelbarrows involves a carrying bin supported by a frame with a forwardly attached wheel and a two rearwardly attached handles.

The U.S. patent to Primeau, U.S. Pat. No. 4,471,996, discloses a wheelbarrow with handles which rotate between first and a second position. In the first position, the wheelbarrow bin is supported by frame supports, while in the second position the bin rests on the ground for convenient loading and unloading. In order to move the load, the user must lift the handles to a height so that the supports are off the ground. This invention does not incorporate the advantage of the present invention that the load may be moved without the user having to substantially support the weight of the load.

2. Description of the Prior Art

U.S. Pat. No. 3,552,760 to Sine teaches a Folding Wheelbarrow with the similar feature of the Primeau patent that the user must raise the handles and support a substantial portion of the load in order to move the wheelbarrow.

U.S. Pat. No. 3,552,762 to Garber, entitled Wheelbarrow Leg Assembly, relates to a leg assembly having a brace extending between a pair of supporting legs, presumably to assist in supporting the legs. Again, this device does not help the user to support the load while moving the wheelbarrow.

U.S. Pat. No. 3,826,511 to Frank, entitled Collapsible Beach Tote Barrow With Ball Combination, relates to a collapsible beach cart with a removable beach ball as a wheel.

Several other patents related to wheelbarrows exist in the prior art. These include U.S. Pat. No. 3,722,904 to Puckett, titled Foldable Wheelbarrow, U.S. Pat. No. 5,040,808 to Mentyre, titled Utility Cart, U.S. Pat. No. 5,087,061 to Wallace, titled Wheelbarrow-Trailer Implement and U.S. Pat. No. 5,087,062 to Chappell, titled Knock-Down Wheelbarrow and Fastening Devices Thereof. While not without merit, none of these devices provide the utility of the present invention. The aforementioned patents are aimed at convenient storage of wheelbarrows, improved structural rigidity, easy dumping of loads, or other multi-function purposes. These devices do not address any improvements from the standpoint of operational convenience to the person that operates or uses the wheelbarrow.

Both U.S. Pat. No. 1,901,878 to Schwenk, titled Portable Stand and Tilter for Barrels and the Like, and U.S. Pat. No. 4,861,110 to Rumpke, titled Tilt Truck Apparatus, disclose a load carrying device supported by wheels. These devices are suitable only for use on hard surfaces and certainly do not entertain the variety of functions of a wheelbarrow. The present device is intended to be used over a variety of surfaces and as such includes appropriate hardware and suitably-sized wheels to accomplish this task. Similarly, neither device teaches a conveniently adjustable handle intended for pushing or propelling the device as does the present invention.

SUMMARY OF THE INVENTION

The present invention accomplishes the above-stated objectives, as well as others, as may be determined by a fair reading and interpretation of the entire specification.

The present invention may have several embodiments. Generally the invention consists of a load-carrying bin supported by wheels having a pivotally adjustable handle for moving the device.

One object of the present invention is to provide a wheelbarrow that fully supports the weight of its load.

A second object of the present invention is to provide a wheelbarrow with an easily adjustable handle to so that it may be used at a variety of heights while the load carrying bin is fully supported.

Another object of the present invention is to provide a wheelbarrow with a removable handle for convenient storage.

Further objects of the present invention will become apparent from the following detailed description and accompanying drawings that form a part of the specification.

BRIEF DESCRIPTION OF THE DRAWINGS

Various other objects, advantages, and features of the invention will become apparent to those skilled in the art from the following discussion taken in conjunction with the following drawings, in which:

FIG. 9 shows a lateral view as in FIG. 8 with the locking rod in its engaged position and the wheelbarrow pivoted upward on its forward wheel so that the contents of the load carrying bin are being dumped.

DESCRIPTION OF THE PREFERRED EMBODIMENTS

Before explaining the disclosed embodiments of the present invention in detail it is to be understood that the invention is not limited in its application to the details of any particular arrangement shown since the invention is capable of other embodiments. Also, the terminology used herein is for the purpose of description and not of limitation.

Figure 1:
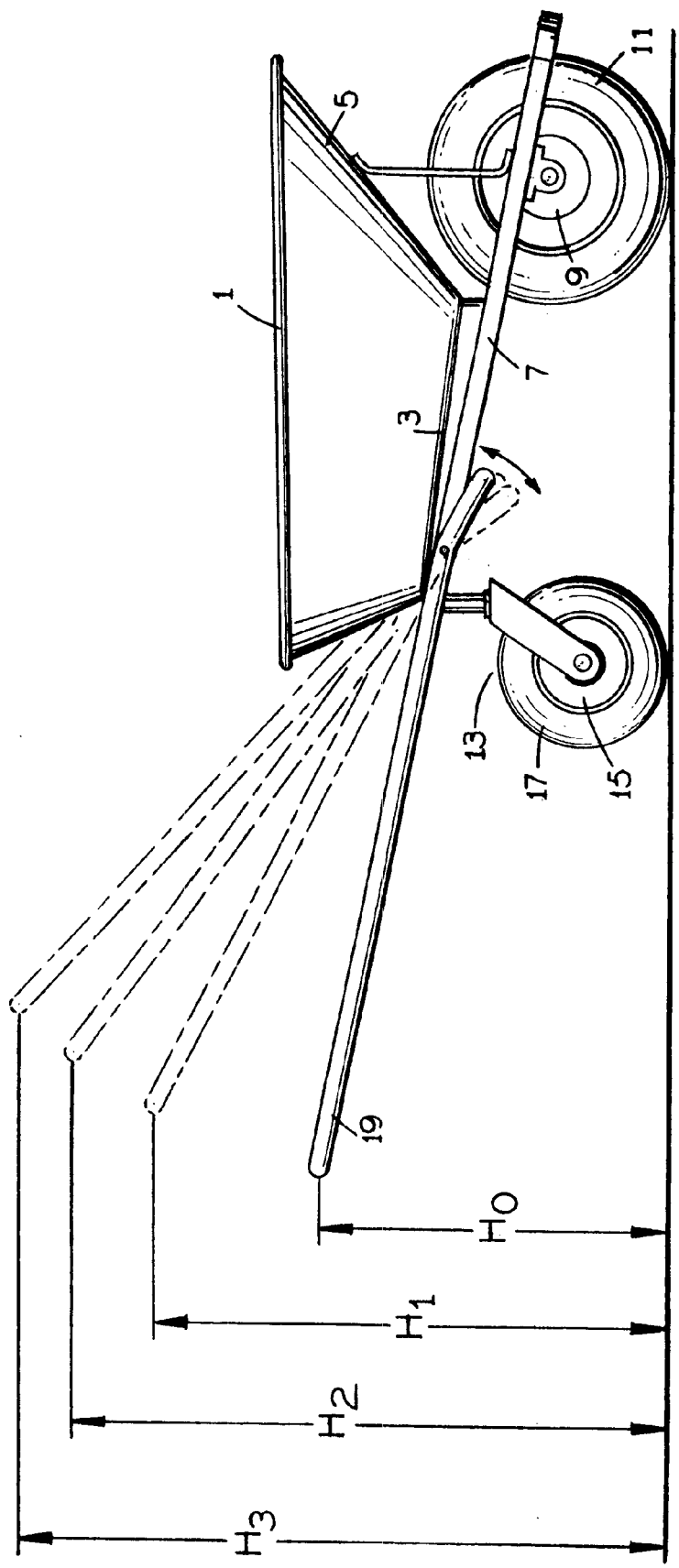
FIG. 1 shows a lateral perspective view of one embodiment of the invention.

FIG. 1 shows a lateral perspective view of one embodiment of the invention. A load carrying bin 1 is shown and it includes a bin bottom wall 3 and a bin side wall 5. A forward wheel assembly 7 primarily consists of elongated tubular members in addition to a wheel hub structure 9 and a wheel 11, which freely rotates about a horizontal axis. The forward wheel assembly 7 is attached to the bin bottom wall 3 and extends toward the rear of the wheelbarrow. A single rearward wheel assembly 13 is visible from this drawing. The rearward wheel assembly 13 includes a wheel hub structure 15 and a wheel 17, which freely rotates about a horizontal axis. A closed loop handle 19 is pivotally attached to the wheelbarrow and provides a way to move the wheelbarrow by pushing or pulling. This drawing displays an important feature of the closed loop handle 19 in that the pivotal attachment allows the handle to reach varying heights $H_o$, $H_1$, $H_2$, and $H_3$. Another feature of the pivotal attachment is that the tubes of the wheel assembly 7 interfere with part of the closed loop handle 19 and provide a lower limit on the closed loop handle's movement. Similarly, the rearward portion of the bin side wall 5 provides an upper limit on the closed loop handle's movement.

Figure 2:
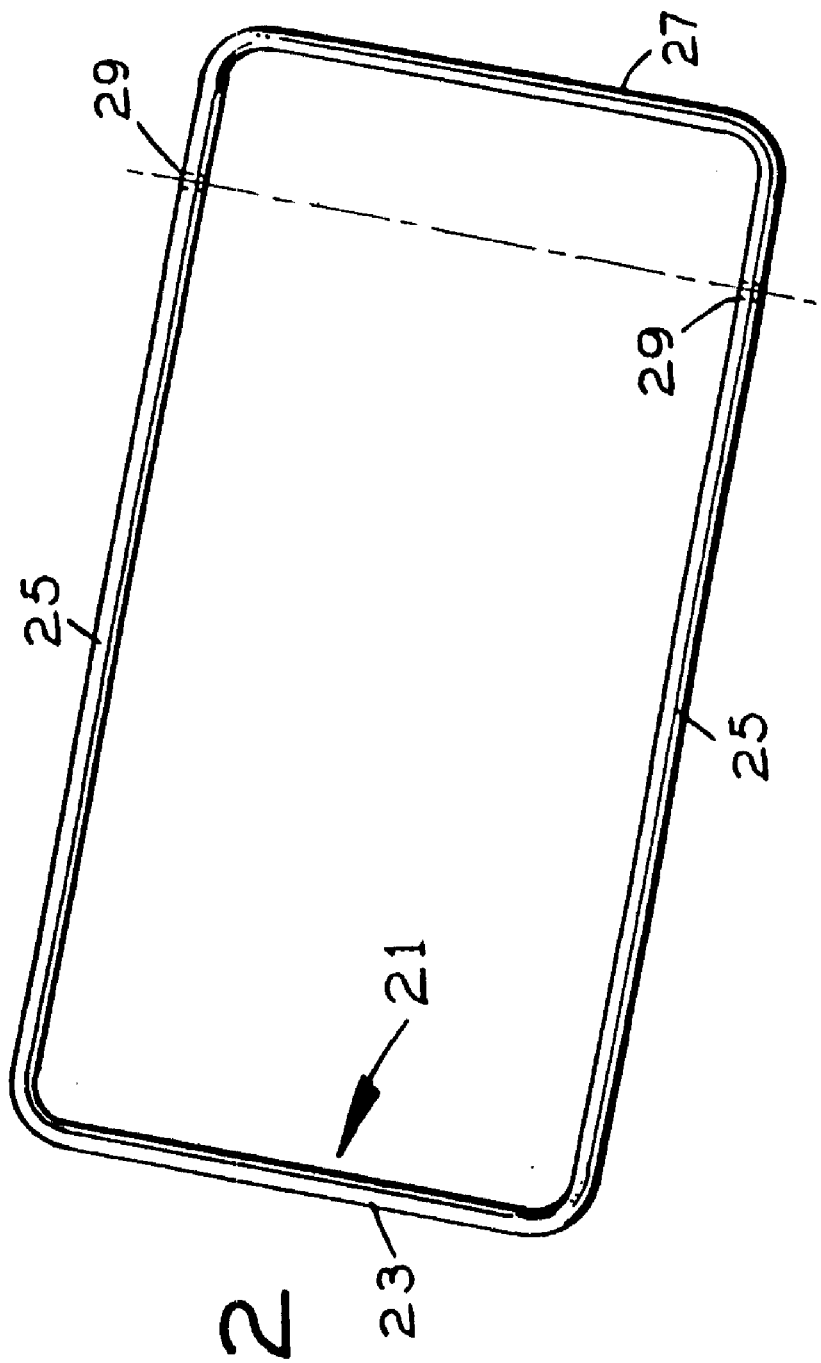
FIG. 2 shows a top perspective view of one embodiment of the closed loop handle.

FIG. 2 shows a top perspective view of one embodiment of the closed loop handle 21. The closed loop handle is made up of several interconnected longitudinal members. The lagging traverse member 23 provides the actual handle portion which is meant to be gripped by the user. Two parallel side members 25 extend from either end of the lagging traverse member 23 and are attached to a leading traverse member 27. The parallel side members 25 interfere with the rearward portion of the bin side wall 5 to provide an upper limit on the closed loop handle's movement, while the leading traverse member 27 interferes with the forward wheel assembly 7 to provide a lower limit on the closed loop handle's movement. Two holes 29 are drilled, one in each of the parallel side members 25 to provide a pivotal mounting point for the closed loop handle 21.

Figure 3:
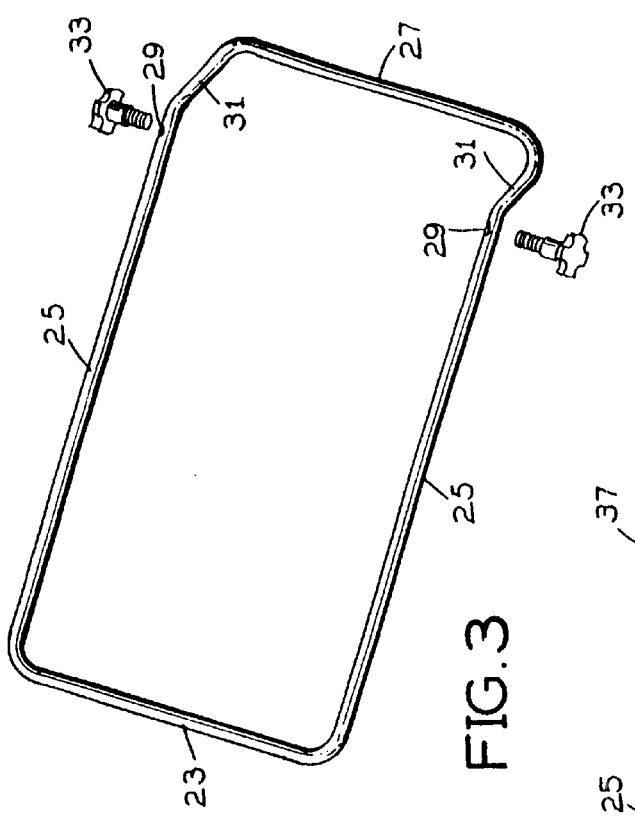
FIG. 3 shows an elevated perspective view of another embodiment of the closed loop handle.

FIG. 3 shows an elevated perspective view of another embodiment of the closed loop handle. In this embodiment the parallel side members 25 each incorporate a downward bend 31 near the mounting hole 29. Also visible in this drawing are adjustable mounting knobs 33 which enable the user to adjust the closed loop handle to different heights, or to fix the handle at one height, or to remove the handle entirely for convenient storage. The mounting knobs 33 have a handle end fixed to a pin with a threaded end opposite the handle.

Figure 4:
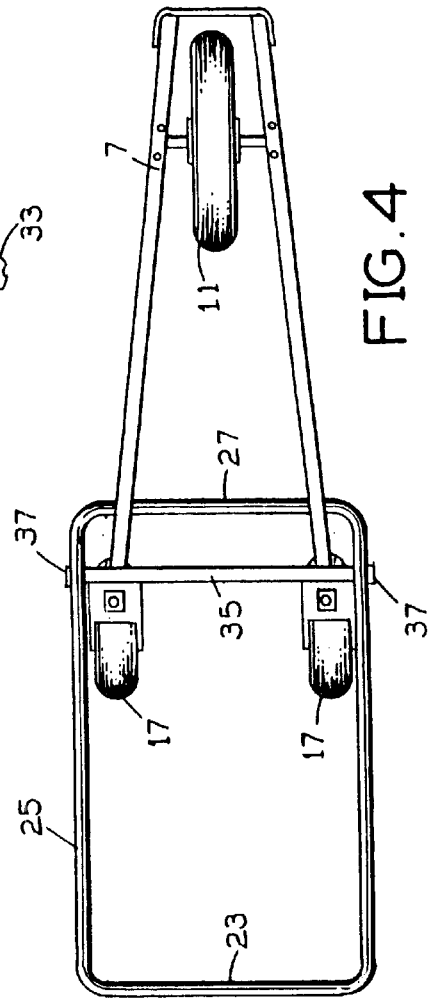
FIG. 4 shows a top perspective view of one embodiment of the invention with the load-carrying bin removed.

FIG. 4 shows a top perspective view of an embodiment of the invention similar to that shown in FIG. 1, with the load-carrying bin removed. This drawing depicts the relationship between the leading traverse member 27 and the forward wheel assembly 7, specifically how the leading traverse member 27 interferes with the tubes on the forward wheel assembly 7 to provide a lower limit on the closed loop handle's pivotal movement. Also presented here is the fulcrum structure 35 which is laterally connected to the forward wheel assembly 7. The closed loop handle is attached to the fulcrum structure 35 at two pivotal mounting points 37. The threaded ends of the mounting knobs 33 (see FIG. 3) engage these mounting points 37 which include threaded portions complimentary to the threads found on the mounting knobs. The wheels shown here 17 and 11 may be installed so that they have only a horizontal axis of rotation or they may also be mounted with a swivel so that the wheel has a vertical swivel axis.

Figure 5:
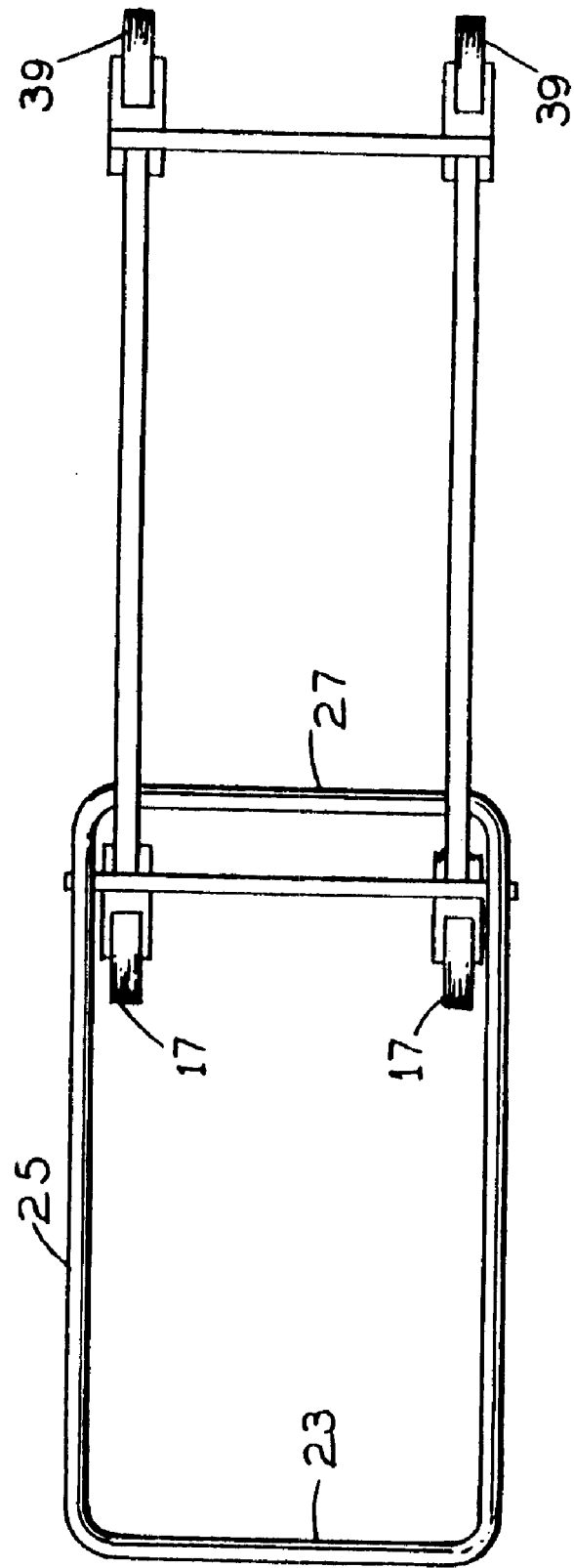
FIG. 5 shows a top perspective view of another embodiment of the invention with the load carrying bin removed.

FIG. 5 shows a top perspective view of another embodiment of the invention with the load carrying bin removed. This embodiment includes two forward wheels 39, which are mounted to have a horizontal axis of rotation and may also include a swivel so that they have a vertical swivel axis.

Figure 6:
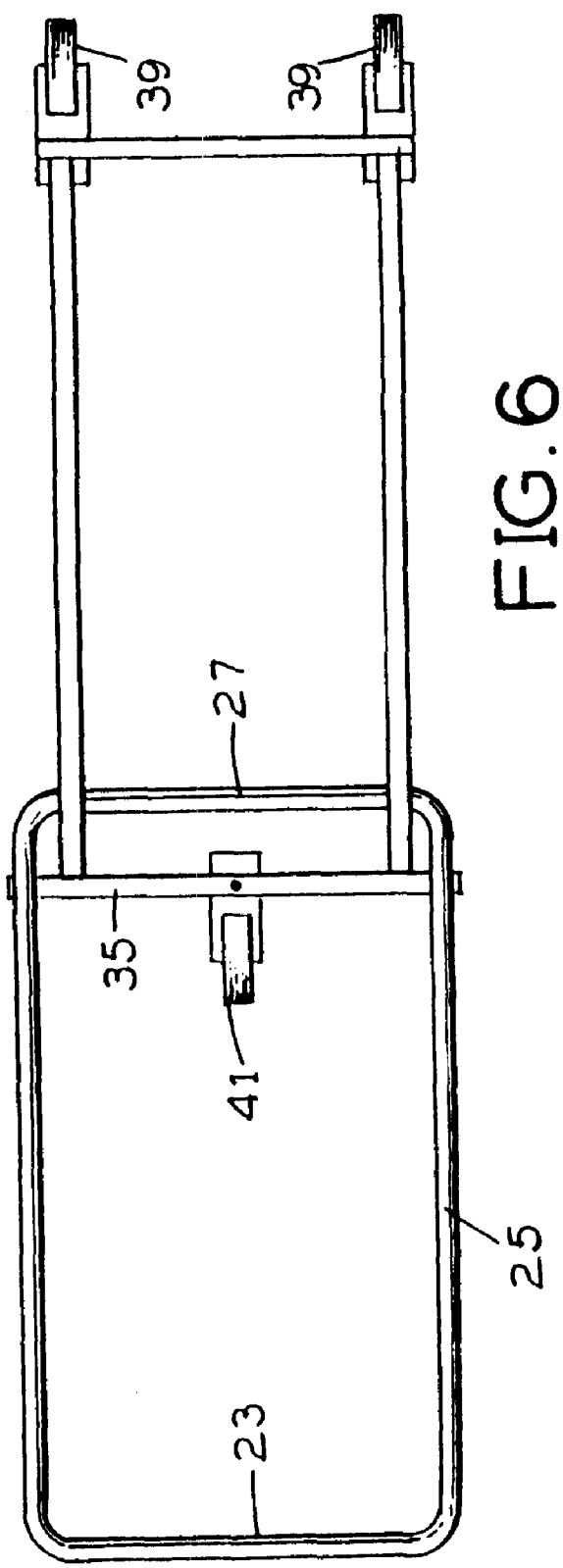
FIG. 6 shows a top perspective view of yet another embodiment of the invention with the load carrying bin removed.

FIG. 6 shows a top perspective view of yet another embodiment of the invention with the load carrying bin removed. This embodiment includes a singular rearward wheel 41 which is mounted to the fulcrum structure 35. This wheel may include not only a horizontal axis of rotation but may also a swivel so that it has a vertical swivel axis. The inclusion of vertical swivel axis on a wheelbarrow wheel makes the movement of the load easier and more convenient for the user.

Figure 7:
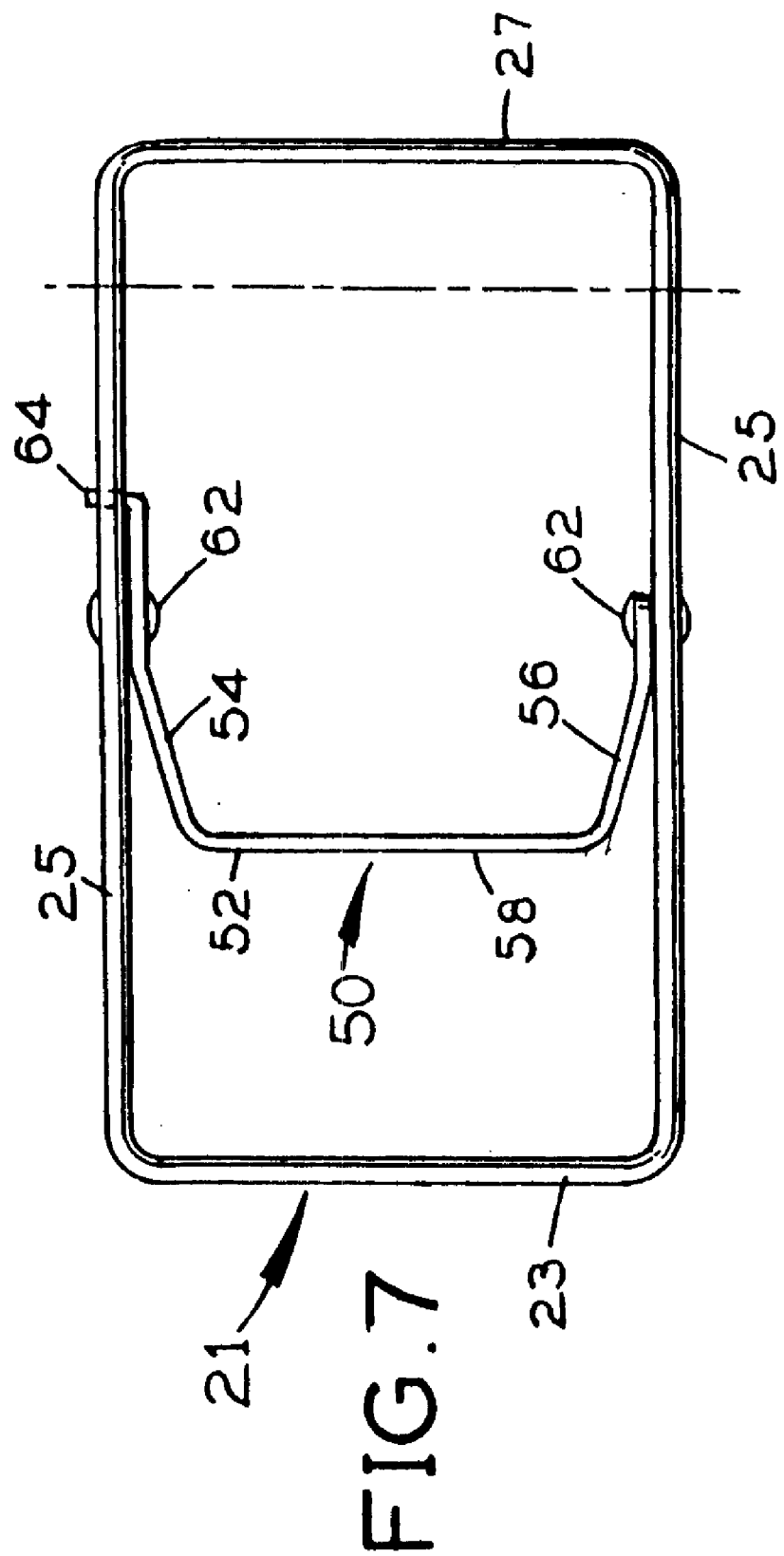
FIG. 7 shows a top perspective view of the closed loop handle, including the optional handle locking assembly.
Figure 8:
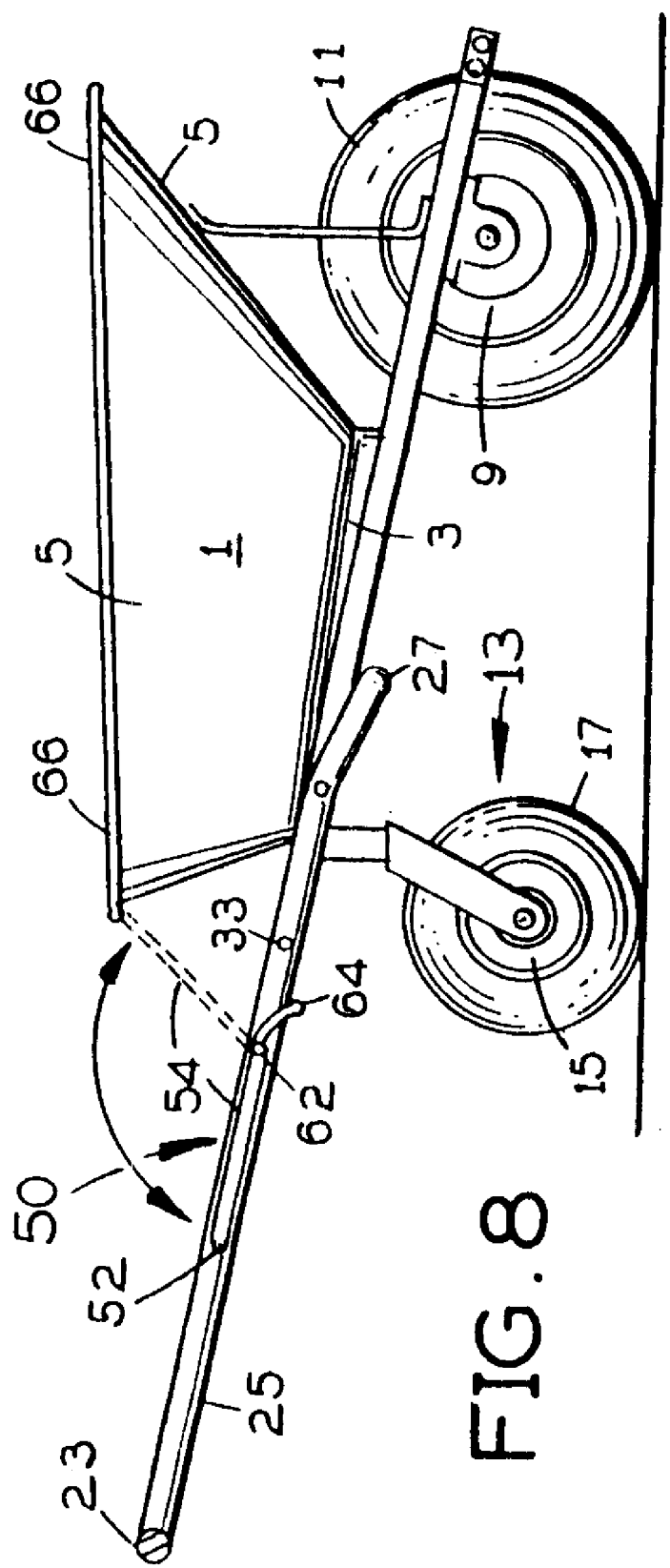
FIG. 8 shows a lateral view of the present invention equipped with the handle locking assembly, the locking rod of which is shown in solid lines in its disengaged position and in broken lines in its engaged position. The closed loop handle is shown in partial cross-section.

FIG. 7 shows a top view of the closed loop handle 21, equipped with an optional handle locking assembly 50 for releasibly locking the loop handle 21 against pivoting relative to the load carrying bin 1. When locking assembly 50 is engaged, lifting the lagging traverse member 23 of the closed loop handle 21 in turn lifts and pivots the forward wheel assembly 7 and bin 1 about the wheel hub structure 15, rather than causing the closed loop handle 21 to simply pivot on the wheel hub structure 15. The handle locking assembly 50 includes a U-shaped locking rod 52 for bridging the space between the loop handle 21 and bin 1. Locking rod 52 includes two generally parallel U-side segments 54 and 56 and an interconnecting U-middle segment 58 interconnecting U-side segments 54 and 56 and sized to fit closely within the loop handle 21. The U-side segments 54 and 56 extend generally along parallel side members 25 of the loop handle 21, and each U-side segment 54 and 56 is pivotally secured to its corresponding and adjacent side member 25 with a fastener 62 such as a rivet or a nut and bolt so that the locking rod 52 pivots within loop handle 21. At least one of the U-side segments 54 and 56 includes a locking rod lateral stop segment 64 extending laterally outward to interfere with and abut the adjacent side member 54 when the locking rod 52 is pivoted to a disengaged, downward position relative to the bin 1. See FIGS. 7 and 8. For engagement, the locking rod 52 is pivoted so that U-middle segment 58 is swung upwardly, over and against the rear wall of the bin 1, where U-middle segment 58 abuts and wedges against bin 1, thereby obstructing upward pivoting of loop handle 21. See FIG. 9. Then lifting lagging member 23 of loop handle 21 lifts the rear end segments of side members 25 and bin 1 and causes them to rotate around wheel hub structure 9, so that the contents of bin 1 are dumped forwardly, as shown in FIG. 9. Bin 1 preferably includes an outwardly protruding peripheral lip 66 of conventional design for catching and abutting U-middle segment 58.

While the invention has been described, disclosed, illustrated, and shown in various terms and certain embodiments, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wheelbarrow comprising:
   a load carrying bin;
   a frame structure secured to and extending longitudinally below the bin, said frame structure having a forward and a rearward portion;
   three or more wheels rotatably attached to the frame structure and protruding generally below the bin;
   a closed loop handle pivotally attached to the rearward portion of the frame structure so that the handle may be used at a variety of heights to suit the user's taste, said closed loop handle having two opposing handle side members and having a closed loop handle rearward portion spaced apart from said bin and a close loop handle forward portion;

and closed loop handle locking means comprising means for bridging the space between and thereby bracing said closed loop handle against said load carrying bin and against pivoting toward said load carrying bin.

2. A wheelbarrow according to claim 1, wherein said closed loop handle locking means comprises a locking rod having two U-side segments and a U-middle segment interconnecting said U-side segments and being sized to fit within said closed loop handle, wherein said U-side segments are each pivotally secured to an adjacent handle side member with a pivotal securing means, such that said locking rod pivots within said loop handle, such that said loop handle U-middle segment is toward said load carrying bin such that said U-middle segment abuts and wedges against said load carrying bin, thereby obstructing pivoting of said loop handle toward said load carrying bin, and such that said loop handle locking means is disengaged by pivoting said locking rod U-middle segment away from said load carrying bin.

3. A wheelbarrow according to claim 2, wherein at least one of said U-side segments comprises a locking rod lateral stop segment extending laterally to interfere with and abut the adjacent said handle side member as said locking rod is pivoted to a disengaged, away from said load carrying bin.

4. A wheelbarrow comprising:
a load carrying bin;
a frame structure secured to and extending longitudinally below the bin, said frame structure having a forward and a rearward portion;
three or more wheels rotatably attached to the frame structure and protruding generally below the bin;
a closed loop handle pivotally attached to the rearward portion of the frame structure so that the handle may be used at a variety of heights to suit the user's taste, said closed loop handle having two opposing handle side members and having a closed loop handle rearward portion spaced apart from said bin and a close loop handle forward portion;
and closed loop handle locking means comprising a locking rod having two U-side side segments and a U-middle segment interconnecting said U-side segments and being sized to fit within said closed loop handle, wherein said U-side segments are each pivotally secured to an adjacent handle side member with a pivotal securing means, such that said locking rod pivots within said loop handle, such that said loop handle U-middle segment is toward said load carrying bin such that said U-middle segment abuts and wedges against said load carrying bin, thereby obstructing pivoting of said loop handle toward said load carrying bin, and such that said loop handle locking means is disengaged by pivoting said locking rod U-middle segment away from said load carrying bin.

5. A wheelbarrow according to claim 4, wherein at least one of said U-side segments comprises a locking rod lateral stop segment extending laterally to interfere with and abut the adjacent said handle side member as said locking rod is pivoted to a disengaged, away from said load carrying bin.

6. A wheelbarrow comprising:
a bin having a bin bottom wall and a bin side wall and a bin forward portion and a bin rearward portion;
a forward wheel assembly secured to and protruding generally below the level of said bin bottom wall, comprising a wheel hub structure and a wheel rotatably attached to said wheel hub structure;
a fulcrum structure laterally interconnected to said forward wheel assembly between two longitudinal points rearward of the forward wheel;
first and second rearward wheel assemblies laterally spaced apart from each other and secured to said forward wheel assembly rearward of said fulcrum structure and protruding generally below the level of said bin bottom wall, said rearward wheel assemblies each comprising a wheel hub structure and a wheel rotatably attached to said wheel hub structure; and
a closed loop handle comprising a leading traverse member and a lagging traverse member interconnected by two lateral parallel side members such that the four members form a closed loop handle, said closed loop handle being pivotally secured at laterally adjacent points near its leading traverse member to said fulcrum structure such that the two parallel side members extend rearwardly of said bin and serve to interfere against the bin thereby limiting the closed loop handle's pivotal motion in one direction and said leading traverse member serves to interfere against the forward wheel assembly and thereby limits the closed loop handle's pivotal motion in the opposite direction.

7. A wheelbarrow according to claim 6, wherein said forward wheel assembly comprises symmetrically oriented tubular members.

8. A wheelbarrow according to claim 6, wherein said closed loop handle is pivotally attached by adjustable fastening means that in addition to allowing the handle to freely pivot, may be used to fix the handle in one position, or allow the handle to be completely removed.

9. A wheelbarrow according to claim 8, wherein said adjustable fastening means is comprised of two threaded knob-type fastening pins, each having a knob portion attached to a pin with a threaded end which is intended to extend through a hole in the parallel side members of the closed loop handle and mate with complimentary threads in the fulcrum structure.

10. A wheelbarrow according to claim 6, wherein said closed loop handle comprises parallel side members including a downward bend near the leading traverse member, said downward bend being located at approximately the same point longitudinally as the pivotal attachment point of the closed loop handle.

11. A wheelbarrow according to claim 6, wherein said first and second rearward wheel assemblies each comprise a swivel mounted wheel hub having a vertical swivel axis and a wheel rotatably attached to said wheel hub.

12. A wheelbarrow according to claim 6, wherein said forward wheel assembly comprises a swivel mounted wheel hub having a vertical swivel axis and a wheel rotatably attached to said wheel hub.

13. A wheelbarrow comprising:
a bin having a bin bottom wall and a bin side wall and a bin forward portion and a bin rearward portion;
a forward wheel assembly secured to and protruding generally below the level of said bin bottom wall, said wheel assembly comprising a first and a second wheel hub structure, each wheel hub structure being laterally spaced apart from each other, and a wheel rotatably attached to each wheel hub structure;
a fulcrum structure laterally interconnected to said forward wheel assembly between two longitudinal points rearward of the forward wheels;

a rearward wheel assembly secured to said forward wheel assembly rearward of said fulcrum structure and protruding generally below the level of said bin bottom wall, said rearward wheel assembly comprising a wheel hub structure and a wheel rotatably attached to said wheel hub structure; and a closed loop handle comprising a leading traverse member and a lagging traverse member interconnected by two lateral parallel side members such that the four members form a closed loop handle, said closed loop handle being pivotally secured at laterally adjacent points near its leading traverse member to said fulcrum structure such that the two parallel side members extend rearwardly of said bin and serve to interfere against the bin thereby limiting the closed loop handle's pivotal motion in one direction and said leading traverse member serves to interfere against the forward wheel assembly and thereby limits the closed loop handle's pivotal motion in the opposite direction.

14. A wheelbarrow according to claim 13, wherein said forward wheel assembly comprises symmetrically oriented tubular members.

15. A wheelbarrow according to claim 13, wherein said closed loop handle is pivotally attached by adjustable fastening means that in addition to allowing the handle to freely pivot, may be used to fix the handle in one position, or allow the handle to be completely removed.

16. A wheelbarrow according to claim 15, wherein said adjustable fastening means is comprised of two threaded knob-type fastening pins, each having a knob portion attached to a pin with a threaded end which is intended to extend through a hole in the parallel side members of the closed loop handle and mate with complimentary threads in the fulcrum structure.

17. A wheelbarrow according to claim 13, wherein said closed loop handle comprises parallel side members including a downward bend near the leading traverse member, said downward bend being located at approximately the same point longitudinally as the pivotal attachment point of the closed loop handle.

18. A wheelbarrow according to claim 13, wherein said first and second forward wheel hubs are each swivel mounted and have a vertical swivel axis and a wheel rotatably attached to each wheel hub.

19. A wheelbarrow according to claim 13, wherein said rearward wheel assembly comprises a swivel mounted wheel hub having a vertical swivel axis and a wheel rotatably attached to said wheel hub.

20. A wheelbarrow comprising:

a bin having a bin bottom wall and a bin side wall and a bin forward portion and a bin rearward portion;

a forward wheel assembly secured to and protruding generally below the level of said bin bottom wall, said wheel assembly comprising a first and a second wheel hub structure, each wheel hub structure being laterally spaced apart from each other, and a wheel rotatably attached to each wheel hub structure;

a fulcrum structure laterally interconnected to said forward wheel assembly between two longitudinal points rearward of the forward wheel;

and first and second rearward wheel assemblies laterally spaced apart from each other and secured to said forward wheel assembly rearward of said fulcrum structure and protruding generally below the level of said bin bottom wall, said rearward wheel assemblies each comprising a wheel hub structure and a wheel rotatably attached to said wheel hub structure; and a closed loop handle comprising a leading traverse member and a lagging traverse member interconnected by two lateral parallel side members such that the four members form a closed loop handle, said closed loop handle being pivotally secured at laterally adjacent points near its leading traverse member to said fulcrum structure such that the two parallel side members extend rearwardly of said bin and serve to interfere against the bin thereby limiting the closed loop handle's pivotal motion in one direction and said leading traverse member serves to interfere against the forward wheel assembly and thereby limits closed loop handle's pivotal motion in the opposite direction.

21. A wheelbarrow according to claim 20, wherein said forward wheel assembly comprises symmetrically oriented tubular members.

22. A wheelbarrow according to claim 20, wherein said closed loop handle is pivotally attached by adjustable fastening means that in addition to allowing the handle to freely pivot, may be used to fix the handle in one position, or allow the handle to be completely removed.

23. A wheelbarrow according to claim 22, wherein said adjustable fastening means is comprised of two threaded knob-type fastening pins, each having a knob portion attached to a pin with a threaded end which is intended to extend through a hole in the parallel side members of the closed loop handle and mate with complimentary threads in the fulcrum structure.

24. A wheelbarrow according to claim 20, wherein said closed loop handle comprises parallel side members including a downward bend near the leading traverse member, said downward bend being located at approximately the same point longitudinally as the pivotal attachment point of the closed loop handle.

25. A wheelbarrow according to claim 20, wherein said first and second rearward wheel assemblies each comprise a swivel mounted wheel hub having a vertical swivel axis and a wheel rotatably attached to said wheel hub.

26. A wheelbarrow according to claim 20, wherein said first and second forward wheel hubs are each swivel mounted and have a vertical swivel axis and a wheel rotatably attached to each wheel hub.

* * * * *